Patented Oct. 17, 1944

2,360,327

UNITED STATES PATENT OFFICE 2,360,327

PRODUCTION OF MUD-LADEN DRILLING FLUIDS

L. Horace Bailey, New Orleans, and William Ludwell Owen, Jr., and William L. Owen, Baton Rouge, La.

No Drawing. Application January 22, 1942, Serial No. 427,840

24 Claims. (Cl. 252—8.5)

The present invention relates to mud-laden fluids, and more particularly, the application of the said fluids to oil or gas wells. In the more specific form of the present invention, the mud-laden drilling fluid contains a mud base together with a gum dextran suspending agent therefor. This suspending agent functions to improve the properties of the mud-laden fluid and particularly prevents water loss without materially affecting those properties of the mud-laden fluid which should be maintained substantially constant such as the viscosity and specific gravity.

In the past, it has been proposed to use a variety of drilling fluids, and while some of these have given fairly successful results, the prior art drilling fluids in general have several disadvantages which are overcome by the invention herein set forth. The functions of a mud-laden drilling fluid used in the drilling or boring or for the control of oil or gas wells are:

(1) To remove the cuttings from the well as rapidly as possible.

(2) To hold in suspension in the bore hole the cuttings and prevent them from settling when the drilling temporarily ceases. The drilling fluid, in order to so function, must have certain gel characteristics which will allow the drilling fluid to thicken when it is permitted to remain undisturbed.

(3) The drilling fluid must contribute cohesiveness to the loose formations encountered in drilling, and be characterized by the property of building a thin impervious tough wall in the bore hole to resist caving in of the formations forming the walls of the hole. The drilling fluid should protect each and every formation encountered from unnecessary wetting by its ability to decrease "water loss." Therefore, it is important that the mud-laden drilling fluid exhibit low water losses in the usual "Filter Press Tests." However, the protective value of the filter cake should be a function of its imperviousness and durability and not of its mechanical strength as such.

(4) The drilling mud should render the walls of the hole impermeable to the liquid phase of the mud-laden fluid to thereby prevent water loss to the formation. When the walls of the hole are rendered impermeable, the intrusion of gas or liquid is prevented and the hydrostatic pressure within the well is retained.

(5) The mud-laden drilling fluid should act as a lubricant and as a cooling medium for the drill stem and the bit by forming a closely adhering coating functioning to reduce abrasive action on the drill stem and bit and inhibiting the corrosive action of the alkali salts on said drilling equipment.

(6) The drilling fluid should be characterized by the property of readily releasing the cuttings at the desired point when the drilling fluid reaches the oil well surface to thereby provide for the efficient reconditioning of the mud-laden drilling fluid for further use.

An ideal drilling fluid should also be characterized by the following properties:

(7) It should be so flexible in composition that any one physical property of the mud may be varied without materially changing the other properties of the drilling mud. Further, the drilling mud should be independent of exterior factors such as temperature, the action of salt water, and the like.

(8) The drilling mud should be stable in its physical and chemical characteristics and should not separate on standing.

(9) It should be susceptible of easy pumping and distribution.

One of the prior art methods of preparing and conditioning mud-laden drilling fluids so that said fluids will accomplish at least some of the purposes above set forth is to incorporate in the mud-laden drilling fluid bentonite and/or other clays of similar gel-forming characteristics. Such clays are added to the drilling fluid in amounts sufficient to effect adequate wall building properties, and sufficient gel strength, otherwise known as thixotropic characteristics; and thereafter thinning out the so prepared drilling mud with other reagents where the conditions require them to be incorporated in the mud. These drilling fluids are usually weighted with weighting materials, as for example, barium sulphate, barium carbonate, ferric oxide, likewise known as red pigment, and plumbic oxide, usually known as litharge. These weighting agents function to give the mud-laden drilling fluid the necessary specific gravity to balance the gas pressures encountered in the formations being drilled.

The bentonite and similar colloidal clays function as colloidal suspending agents for the mud base, which term includes all the solid components present in the drilling fluid. Further, the bentonite and similar colloidal clays function to impart to the mud-laden drilling fluid the desirable viscosity which adapts the drilling fluid for use in oil or gas wells. It is desired, however, to point out that Bentonite and similar colloidal clays possess the following basic disadvantages:

(1) When bentonite or similar clays are added to a mud-laden drilling fluid in order to reduce during use the water loss of the drilling fluid, the gel strength of the drilling fluid is substantially increased, and this gel strength may reach a point where the mud is no longer serviceable for its intended purpose. It is therefore clear that the reduction in water loss in a drilling fluid during its application in a bore hole can frequently be obtained only by an undesirable acquisition of excessive gel strength where more than an average amount of clay is required.

(2) Bentonite or a similar colloidal clay forms drilling fluids which tend to flocculate whenever an appreciable quantity of salt water is encountered in the drilling of the oil or gas well since a portion of the salt water is incorporated as a fluid element in the mud-laden drilling fluid. When this occurs, bentonite or similar clays exhibit very decided tendency to flocculate and release free water, and as a result, the wall building properties of the mud-laden drilling fluid are rapidly destroyed. In view of the fact that an ever increasing number of oil and gas wells are now being drilled through salt strata, or during the drilling of the well underground salt water flows are encountered, it becomes necessary to overcome the disadvantages inherent in the use of the colloidal clays.

It has also been proposed to incorporate in the mud-laden drilling fluid such gums as karaya, ghatti and tragacanth, as well as various starches in an attempt to prevent the destruction or deterioration of the mud-laden drilling fluids as they encounter salt strata or salt water flows. These materials, while exhibiting some desirable characteristics, have certain disadvantages. The gums may cause too great an increase in the viscosity of the mud-laden drilling fluid, and as previously pointed out, as a general proposition, it is desirable to maintain the viscosity of the drilling fluid substantially constant. Further, the imported gums are not always available. The starches, when used as a colloidal suspending agent in a mud drilling system, may spoil rather quickly unless the starches are used in highly caustic solutions, and this is disadvantageous because said caustic solutions are difficult to handle.

It has been discovered that a mud-laden drilling fluid containing gum dextran possesses many advantageous properties which enables the drilling fluid to be economically and efficiently applied in the boring of oil and gas wells. Gum dextran is most advantageously produced by the fermentation of a sucrose containing material as, for example, sugar cane, sugar beet, sorghum, and maple sap. Sucrose, which is a disaccharose, is preferably fermented by a bacterium known as genus Leuconostoc Van Tieghem emend. Hucker and Pederson, Species *Leuconostoc mesenteroides* (Cienkowski Van Tieghem), Bergey's Manual Determinative Bacteriology, fifth edition. It may be stated that the isolation of this species dates from 1878. The gum dextran produced by fermentation with the above-mentioned bacterium has the formula $(C_6H_{10}O_5)_n$, is a mucilaginous substance which is dextro-rotatory with a value of approximately $a/D$ plus 200, and is characterized by a high viscosity. Gum dextran is precipitated by alcohol, is soluble in alkalis, and can be hydrolyzed into dextrose by sulphuric acid.

The conversion of sucrose into gum dextran may be illustrated by the following reaction:

Sucrose    Dextran    Fructose
$C_{12}H_{22}O_{11} = (C_6H_{10}O_5)_n$ and $C_6H_{12}O_6$ The above equation, however, does not include side reactions involving the generation of by-products including acids and fermentation gases.

In view of the above, it is quite clear that the primary object of the present invention is to provide a mud-laden drilling fluid containing a mud base and a gum dextran colloidal suspending agent therefor, the latter imparting the desired characteristics to the mud-laden drilling fluid such as minimum water loss and desirable viscosity.

A supplemental object of the invention is to provide a mud-laden drilling fluid in which there has been incorporated a gum dextran composition produced by a fermentation process.

A further object of the present invention is to provide a mud-laden drilling fluid for oil or gas wells comprising a mud base and a sucrose fermented substrate acting as a suspending medium for the mud base and to impart to the mud-laden drilling fluid the desired viscosity and a low "water loss," said fermented subtrate containing as its essential suspending agent or component, gum dextran, together with a small proportion of sugar components and degraded sugar components.

It is an auxiliary object of the present invention to provide a drilling fluid having incorporated therein gum dextran which is substantially free of materials producing fermentation by-products. In the preferred form of the invention, this object is attained by incorporating in the fermented sucrose a fermentation suppressing agent. Broadly, any fermentation suppressing agent may be used which does not deleteriously affect the colloidal suspending properties of the gum dextran when it is incorporated as a component of the mud-laden drilling fluid. Preferably, the fermentation suppressing agent is an organic compound capable of combining with the sugar present in the gum dextran fermentation substrate, said organic compound being preferably characterized by the ability to form a viscous condensation product incapable of reducing the viscosity of the gum dextran composition during preparation and when the said composition functions as the suspending agent or as an auxiliary suspending agent in the mud-laden drilling fluid. While the phenols are the preferred fermentation agents, other organic compounds may be used, such as formaldehyde and the like.

The term "phenol" as herein used is intended to cover the entire class of phenols and is not used merely to designate phenol per se. The term "phenol" includes monohydric phenols, substitution products thereof, and derivatives thereof. Also included in the term phenol are the dihydric phenols including their substitution products and derivatives.

Another object of the present invention is to provide a mud-laden drilling fluid containing a mud base and a colloidal organic suspending agent which maintains its desirable properties including its gel properties when the mud-laden drilling fluid encounters salt strata or salt water flows.

Another object of the present invention is to provide a mud-laden drilling fluid in which there has been incorporated a dried, stable suspending medium containing gum dextran as its essential suspending component, together with other constituents which contribute to the desirable characteristics of the gum dextran composition as a suspending agent.

A supplementary object of the present invention is to provide a mud-laden drilling fluid containing gum dextran as its essential suspending agent, said drilling fluid being characterized by the properties of retaining during use its gelling characteristics and exhibiting a small water loss on aging either during use in the oil or gas well or while on the surface, when it may become necessary to store the mud-laden drilling fluid.

The following illustratively sets forth one method of preparing the gum dextran composition which may be used as the colloidal suspending agent for the mud base of mud-laden drilling fluids. The substate which is fermented is normally composed of the following ingredients:

| | |
|---|---|
| Cane sugar | grams__ 150 |
| Tryptone | do____ 10 |
| Yeast extract | do____ 1 |
| Di-potassium phosphate | do____ 1 |
| Water | ccs__1000 |

The medium is sterilized at 240° F. for about 30 minutes and is then seeded with 10 ccs. of the herein described culture of *Leuconostoc mesenteroides*. Thereafter, the so treated substrate is incubated at a temperature favoring the production of the maximum amount of gum dextran. The preferred temperature is between 25° and 30° C. This temperature may be considerably varied and still come within the spirit of the present invention. The so prepared medium is allowed to ferment for a suitable length of time until it becomes so viscous that it appears like a solid mass and shows little or no tendency to flow or change its shape when the container of the mass is shaken vigorously. Usually this viscous state is attained at the end of 48 hours, although here again the time of fermentation may be considerably varied and still come within the spirit of the present invention. The important point is that the time should be sufficient to allow the solution to assume a viscous state of the character above set forth. The fermented mash produced as above set forth analyzes approximately as follows:

| | |
|---|---|
| Reducing sugars including levulose | per cent__ 1.5 |
| Titratable acidity | cc. N/10 NaOH__ 3-4 |
| Gum dextran | per cent__ 7-8 |

It has been discovered that the fermented mash may be directly incorporated in a drilling fluid. However, as shown by the above analysis, the fermented mash contains a considerable amount of unfermented sugars. The presence of these unfermented sugars in the mud-laden drilling fluid sets up a gaseous fermentation tending to reduce its efficiency.

After discovery was made that the fermented mash containing as its predominating component gum dextran was unstable due to the production of fermentation products, efforts were made to stabilize the fermented mash and this was accomplished by the addition of a fermentation suppression agent. It was ascertained that the phenols including the monohydric and dihydric phenols, their substitution products and their derivatives, functioned admirably as the fermentation suppression agent. More specifically, it was ascertained that the addition of approximately 2% of crude cresylic acid completely inhibited fermentation of the gum dextran composition after its preparation and during its use as the suspending agent in the mud-laden drilling fluid. Instead of using cresylic acid, higher phenols may be used, as for example, thymol and phenylic derivatives including sodium phenyl phenate. As these latter fermentation suppression agents have a higher "phenol coefficient," amounts as small as .5% to 1% thereof may be used. Instead of using the phenols as fermentation suppression agents, formaldehyde, copper sulfate and bichloride of mercury may be used. There are many prior art preservatives which may be used, the criterion of use being that the preservative must suppress fermentation and not deleteriously affect the physical and chemical properties of the gum dextran during the time it is being prepared or after it has been incorporated in the mud-laden drilling fluid. It is desired to point out that the percentage of fermentation suppression agent which may be added to the fermented mash will vary with the percentage of degraded sugars or other compounds induced by fermentation which are capable of further fermentation, and in accordance with the fermentation suppression characteristics of the fermentation suppression agent used. In general, the amount of fermentation suppression agent which is added to the fermented mash will vary from about .25% to about 2 or 2.5%, said percentage being taken on the volume of the fermented substrate; that is, for example, 2 ccs. are added per 100 ccs. of the fermented substrate. It is desired to point out that the crude cresylic acid above set forth contains a small amount of phenol, the three cresols and considerable amounts of higher phenols including various xylenols. The cresylic acid may also contain some of the higher tar acid fractions.

The addition of fermentation suppression agents to the fermented substrate in the amount specified will inhibit further fermentation of the gum dextran suspending composition in the drilling fluid over relatively long periods, as for example, 3 to 4 weeks. However, when the mud-laden drilling fluid is in use over a relatively long period of time, as for example, 2 to 3 months, approximately double the amounts of the fermentation suppression agent above specified are used. Therefore, in some cases the amount of fermentation suppression agent added to the fermented mash or substrate may vary from about .5% to about 5% by volume. The presence of the fermentation suppression agents not only prevents fermentation of the sugars or sugar degradation products present in the fermented gum dextran composition, but also exerts no adverse effect on the viscosity of the substrate. In other words, the fermentation suppression agents do not, of themselves, reduce the viscosity of the substrate. Preferably there are used fermentation suppression agents which will combine with the sugars and sugar degradation products to form viscous condensation products. Therefore, in the preferred form of the invention, the fermentation suppression agent should be one which does not adversely affect the viscosity of the substrate, but on the other hand, being highly viscous itself, maintains the desired optimum viscosity of the gum dextran composition during its preparation and during its repeated use as a constituent of the mud-laden drilling fluid. The following Table 1 illustrates the comparative filtration losses and filter cake thicknesses of laboratory-made muds with or without the addition of fermented mash containing gum dextran, said fermented mash being prepared by the method set forth and having had added thereto a phenol fermentation suppression agent. Tests were made by subjecting 500 ccs. of mud to 100 pounds pressure for 30 minutes in a standard Bariod low pressure filter press, an instrument in common use for testing mud-laden drilling fluids. Sufficient water was present in the drilling fluid to simulate the liquid phase of drilling fluids encountered in active practice.

*Table 1*

| Test No. | Clay "Spudite" | Gum dextran | NaCl | Weight per gallon | 30 min. water loss | Cake thickness |
|---|---|---|---|---|---|---|
| | Per cent | Per cent | Per cent | | Ccs. | Inches |
| 73 | 10 | None | 2¾ | 10½ | 23 | ⁵⁄₆₄ |
| 71 | 10 | 1 | 2¾ | 10½ | 18 | ⁴⁄₆₄ |
| 74 | 10 | 2 | 2¾ | 10½ | 10¾ | ³⁄₆₄ |
| 72 | 10 | 3 | 2¾ | 10¼ | 8¼ | ³⁄₆₄ |

It has been discovered that while the fermented mash or substrate may be incorporated directly in the mud-laden drilling fluid, it is highly advantageous to produce a solid dry product from the fermented substrate and to incorporate this solid dry product in the mud-laden drilling fluid. Preferably, the fermented mash is converted into a solid dry product by spray drying the entire substrate including the gum after the fermentation has been completed, said fermented substrate having had added thereto before drying a fermentation suppression agent of the character and in the preferred amount above set forth. Usually the fermented mash is treated with about 2% of cresol taken on the volume of the fermented substrate. This method of preparation has the advantage that other constituents of the fermented substrate, in addition to the gum dextran, contribute to the value of the composite colloidal suspending agent. More particularly, the unfermented levulose is converted by the phenols into a highly viscous condensation or polymerization product highly unsusceptible to fermentation. The spray drying of the entire substrate including the gum produces a grayish powder which may be shipped in cans or bags to the precise location where it is to be used, and it may be kept there indefinitely without deterioration until it is added to the mud-laden drilling fluid. The analysis of the crude powdered gum dextran composition prepared as above set forth is as follows:

Moisture _____ per cent __ 3.54
Ash _____ do ____ 3.79
Invert sugar _____ do ____ 8.18
Specific gravity _____ 0.6561
Gum dextran _____ per cent __ 84.49

It is obvious that the percentage of gum dextran and impurities may vary considerably depending upon the specific character of the starting materials and the conditions under which the fermentation is carried out. Therefore, the analysis above set forth may be considered typical and illustrative, and may vary considerably, and still come within the spirit of the present invention.

The viscosity of the composition was tested on a solution containing 10 grams of the composition suspended in 100 cc. of water, using the Dudley pipette. This produced a viscosity number of 67. The viscosity of ordinary water as determined by using a Dudley pipette was 31. These relative numbers indicate how the composite dried gum dextran suspending agent functions to increase the viscosity of the fluid to which it has been added.

The gum dextran may be isolated for use in drilling muds by precipitating it from its substrate by the addition of a suitable precipitating agent, the substrate having been first neutralized with any of the prior art neutralization agents, as for example, sodium hydroxide. Preferably the gum dextran is precipitated from its substrate by the addition of ethyl, propyl, or iso-propyl alcohols. For complete precipitation of the gum approximately 2 parts of 95% alcohol are required to 1 part by volume of the substrate. After the substrate has been treated with an alcohol precipitating agent as above set forth, the alcoholic solution is decanted and the gum dextran freed from residual alcohol by drying. This product may then be dried further and pulverized, or it may be spray dried. The gum dextran so prepared has the advantage that it is substantially free of by-products susceptible to fermentation during the use of the gum dextran as the suspending agent in a mud-laden drilling fluid.

The cost of the gum dextran prepared in the above manner is so high as to prohibit its commercial use in the treatment of mud-laden drilling fluids unless from a commercial standpoint the cost can be reduced by recovering valuable products of fermentation, and especially the lactic acid and the unfermented levulose. These products may be recovered from the alcoholic solution remaining after the precipitation of the gum dextran by distilling the alcohol from the alcoholic solution, recovering the same for subsequent use, and then precipitating lactic acid from the alcohol-free solution by the addition of a suitable precipitating agent, such as zinc carbonate, which forms an insoluble zinc lactate which may be removed from the solution by filtration. The levulose solution which, it has been ascertained, is decolorized by the action of the zinc, may be concentrated under a vacuum and sold as a levulose syrup, for which there is a considerable demand.

In order to ascertain the effects of crude powdered dextran composition on mud-laden well drilling fluids, as well as the stability of the composition containing dextran on aging in the mud-laden drilling fluids, a series of tests were made on laboratory prepared drilling muds. Spudite clay was used in all the tests and weighted as desired with barium sulphate. All the tests were made with a mud having a liquid phase which simulated the liquid phase of a mud-laden drilling fluid. The crude powdered gum dextran composition used in this test and in all the other tests herein set forth was prepared by the fermentation process herein set forth and analyzed as above set forth. The crude powdered gum dextran composition in all cases had a phenol fermentation suppression agent added thereto. All of the tests herein set forth were made by subjecting 500 ccs. of mud to 100 pounds pressure for 30 minutes in a standard Baroid low pressure filter press.

The following Table 2 shows the effect of the crude powdered gum dextran composition prepared as above set forth when the latter is combined with various percentages of a mud base such as clay, and fresh water, said powdered gum dextran composition having present a fermentation suppression agent. The table also illustrates the stability of the crude powdered gum dextran composition on aging 3 weeks in the mud-laden drilling fluid.

Table 2

| Test No. | Clay | Gum | Weight per gallon | Aged 3 days | | Aged 21 days | |
|---|---|---|---|---|---|---|---|
| | | | | 30 min. water loss | Filter press cake | 30 min. water loss | Filter press cake |
| | Per cent | Per cent | | Cc. | Inches | Cc. | Inches |
| 38 | 5 | None | 10.5 | 47 | 19/32 | 47 | 19/32 |
| 87 | 5 | 2.0 | 10.5 | 8¾ | 1/32 | 8½ | 1/32 |
| 48 | 10 | None | 10.5 | 16 | 3/32 | 16 | 3/32 |
| 81 | 10 | 2.0 | 10.5 | 7¼ | 1/32 | 6 | 1/32 |
| 35 | 15 | None | 10.5 | 12 | 4/32 | 12 | 4/32 |
| 85 | 15 | 2.0 | 10.5 | 7 | 3/32 | 6½ | 3/32 |

The following table clearly illustrates that when the powdered dextran composition herein disclosed is incorporated in a mud-laden drilling fluid containing 2¾% of sodium chloride, the water loss of the drilling fluid is kept to a minimum. It may be stated that sea water has an average content of 2¾% sodium chloride. The mud-laden drilling fluids tested were provided with this content in order to approximate the salt content of sea water. Table 3 also illustrates the stability of the powdered gum dextran composition on aging in the mud-laden drilling fluid for a period of 3 weeks.

Table 3

| Test No. | Clay | Gum | NaCl | Weight per gallon | Aged 3 days | | Aged 21 days | |
|---|---|---|---|---|---|---|---|---|
| | | | | | 30 min. water loss | Filter press cake | 30 min. water loss | Filter press cake |
| | Per cent | Per cent | Per cent | | Cc. | Inches | Cc. | Inches |
| 39 | 5 | None | 2¾ | 10.5 | 47 | 29/64 | 47 | 29/64 |
| 88 | 5 | 2.0 | 2¾ | 10.5 | 11¾ | 4/64 | 13 | 4/64 |
| 73 | 10 | None | 2¾ | 10.5 | 23 | 19/64 | 23 | 19/64 |
| 82 | 10 | 2.0 | 2¾ | 10.5 | 10½ | 3/64 | 9¼ | 3/64 |
| 36 | 15 | None | 2¾ | 10.5 | 24½ | 29/64 | 24½ | 29/64 |
| 86 | 15 | 2.0 | 2¾ | 10.5 | 8¼ | 9/64 | 8¾ | 9/64 |

Table 4 shows the effect of various percentages of the crude powdered gum dextran composition in fresh and salt water muds containing 10% clay. This table also illustrates the stability of the crude powdered dextran composition on aging in the mud for a period of 3 weeks. The crude powdered gum dextran composition was prepared by the fermentation process set forth and had incorporated therein a phenol fermentation suppression agent.

Table 4

| Test No. | Clay | Gum | NaCl | Weight per gallon | Aged 3 days | | Aged 21 days | |
|---|---|---|---|---|---|---|---|---|
| | | | | | 30 min. water loss | Filter press cake | 30 min. water loss | Filter press cake |
| | Per cent | Per cent | Per cent | | Cc. | Inches | Cc. | Inches |
| 101 | 10 | None | None | 10.5 | 17½ | 4/64 | 17½ | 4/64 |
| 49 | 10 | None | 2¾ | 10.5 | 29 | 12/64 | 29 | 12/64 |
| 77 | 10 | ½ | None | 10.5 | 16 | 4/64 | 15 | 3/64 |
| 78 | 10 | ½ | 2¾ | 10.5 | 26½ | 5/64 | 30 | 5/64 |
| 79 | 10 | 1 | None | 10.5 | 10½ | 3/64 | 14¼ | 4/64 |
| 80 | 10 | 1 | 2¾ | 10.5 | 14½ | 2/64 | 15 | 4/64 |
| 81 | 10 | 2 | None | 10.5 | 7¼ | 3/64 | 6 | 2/64 |
| 82 | 10 | 2 | 2¾ | 10.5 | 10½ | 4/64 | 9¼ | 3/64 |
| 83 | 10 | 3 | None | 10.5 | 6¾ | 4/64 | 6¾ | 3/64 |
| 84 | 10 | 3 | 2¾ | 10.5 | 7 | 3/64 | 7½ | 3/64 |

Table 5 shows the effect of incorporating various percentages of the crude powdered gum dextran composition on the viscosity of the mud-laden drilling fluid as measured through the standard Marsh funnel.

The viscosity was measured in seconds required for 500 ccs. of the mud to run out of the funnel into which 1000 ccs. had been poured. This is a well known method of testing viscosity of mud-laden drilling fluids. In these tests, the mud-laden drilling fluid was that which was being used on a south Louisiana well and the viscosity was measured directly on the drilling rig.

Table 5

| Test No. | Gum | NaCl | Weight gallons | Marsh funnel viscosity in sec. required for 500 ccs. mud to run out of funnel into which 1000 ccs. had been poured |
|---|---|---|---|---|
| | Per cent | Per cent | | |
| A | None | 0.09 | 9.7 | 31 |
| B | ½ | 0.09 | 9.7 | 35 |
| C | 1 | 0.09 | 9.7 | 36 |
| D | 1½ | 0.09 | 9.7 | 38 |
| E | 2 | 0.09 | 9.7 | 41 |

Table 6 shows the effect on water loss and viscosity of varying pH values of standard mud-laden drilling fluid samples containing 10% clay and 2% powdered gum dextran composition weighted to 10.5 pounds per gallon. The pH was lowered by adding phosphoric acid and was raised by adding caustic soda solution. This series of experiments clearly demonstrated that the gum dextran composition was effective in the drilling mud when the pH of the gum composition varied between 2 to 11; that is, from decidedly acid through neutral and to decidedly alkaline. It also clearly indicates that when the gum dextran composition is maintained at and adjacent a pH of 6, this pH produces less effect on the viscosity of the mud-laden drilling fluid than other pH values.

Table 6

| Test No. | pH | Gum | Clay | NaCl | Weight per gallon drilling fluid | Marsh funnel viscosity 1000 in 500 out | 30 min. water loss | Filter cake |
|---|---|---|---|---|---|---|---|---|
| | | Per cent | Per cent | Per cent | | | Cc. | |
| 100 | 11 | 2 | 10 | None | 10.5 | 65 | 7½ | 3/64 |
| 99 | 11 | 0 | 10 | None | 10.5 | 20 | 13¾ | 5/64 |
| 93 | 8 | 2 | 10 | None | 10.5 | 65 | 7¾ | 3/64 |
| 101 | 8 | 0 | 10 | None | 10.5 | 23 | 17½ | 4/64 |
| 96 | 6 | 2 | 10 | None | 10.5 | 35 | 7¾ | 2/64 |
| 95 | 6 | 0 | 10 | None | 10.5 | 20 | 15½ | 5/64 |
| 98 | 4 | 2 | 10 | None | 10.5 | 42 | 9 | 3/64 |
| 97 | 4 | 0 | 10 | None | 10.5 | 24 | 22 | 6/64 |
| 92 | 2 | 2 | 10 | None | 10.5 | 62 | 13 | 4/64 |
| 94 | 2 | 0 | 10 | None | 10.5 | 50 | 37¾ | 19/64 |

The following table shows the effect on water loss or filtration loss by adding additional barium sulphate to a mud, said mud being in the presence of clay and 2% powdered gum dextran, being a prepared mud containing 15% clay.

Table 7

| Test No. | Weight per gallon | Gum | Clay | NaCl | pH | 30 min. water loss | Cake |
|---|---|---|---|---|---|---|---|
| | | Per cent | Per cent | Per cent | | Cc. | |
| 85 | 10.5 | 2 | 15 | None | 8 | 7 | 3/32 |
| 86 | 10.5 | 2 | 15 | 2¾ | 8 | 8¼ | 3/32 |
| 89 | 15.0 | 2 | 15 | None | 8 | 6 | 3/32 |
| 90 | 15.0 | 2 | 15 | 2¾ | 8 | 7 | 3/32 |

Table 8 shows the effect on filtration loss caused by varying the salt content in the standard test mud-laden drilling fluid containing 10% clay and weighted to 10.5 pounds per gallon with barium sulphate.

Table 8

| Test No. | Weight per gallon | Gum | Clay | NaCl | 30 min. water loss | Cake |
|---|---|---|---|---|---|---|
| | | Per cent | Per cent | Per cent | Cc. | |
| 48 | 10.5 | None | 10 | None | 16 | 3/32 |
| 81 | 10.5 | 2 | 10 | None | 7¼ | 1/32 |
| 49 | 10.5 | None | 10 | 2¾ | 29 | 6/32 |
| 50 | 10.5 | 2 | 10 | 2¾ | 14¼ | 4/32 |
| 69 | 10.5 | None | 10 | 10 | 56½ | 8/32 |
| 68 | 10.5 | 2 | 10 | 10 | 16½ | 3/32 |

It is desired to indicate that all the tests above set forth, with the exception of those appearing in Table 5 were made in the laboratory on artificially prepared muds since said muds lend themselves more easily to experimental investigation. However, many tests have been made on samples of drilling muds taken from wells in operation in south Louisiana. These tests have consistently shown that the introduction of gum dextran compositions into the mud-laden drilling fluid imparts to the latter excellent wall building properties and that the advantages clearly demonstrated by laboratory tests are more pronounced in tests actually conducted in the field and upon working drilling muds taken from active wells. The following Table 9 indicates the water loss obtained on a mud taken from a south Louisiana well, said mud-laden drilling fluid having incorporated therein various percentage of gum dextran.

Table 9

| Gum dextran | Weight of mud | NaCl | pH | 30 min. water loss | Filter cake |
|---|---|---|---|---|---|
| Per cent | Pounds | Per cent | | Cc. | |
| None | 9.7 | 0.09 | 8.1 | 14.5 | 4/64 |
| 0.5 | 9.7 | 0.09 | 8.1 | 11.1 | 3/64 |
| 1.0 | 9.7 | 0.09 | 8.1 | 8.1 | 3/64 |
| 1.5 | 9.7 | 0.09 | 8.1 | 6.1 | 2/64 |
| 2.0 | 9.7 | 0.09 | 8.1 | 5.5 | 2/64 |

The following Table 10 shows the results obtained by incorporating gum dextran in a powdered state in mud-laden drilling fluid taken from the Bartaria Field in south Louisiana.

Table 10

| Gum dextran | Weight of mud | NaCl parts per million | pH | 30 min. water loss | Filter cake |
|---|---|---|---|---|---|
| Per cent | Pounds | | | Cc. | |
| None | 10.2 | 7,100 | 8.4 | 32 | 10/64 |
| 2 | 10.2 | 7,100 | 8.4 | 3¾ | 2/64 |

The following Table 11 indicates the water loss obtained in tests made on a drilling mud taken from the Lake Long Field, said mud having added thereto 2.5% of sodium chloride by volume taken on the weight of the drilling mud, and varying percentages of the powdered gum dextran composition herein set forth, said gum dextran composition having been prepared by the method herein set forth and in the presence of a fermentation suppression agent.

Table 11

| Gum dextran | Weight of mud | NaCl | pH | Marsh funnel vis. 1000 in 500 out | 30 min. water loss | Filter cake |
|---|---|---|---|---|---|---|
| Per cent | | Per cent | | | Cc. | |
| None | 9.6 | 2.5 | 7.2 | 30 | 46 | 10/32 |
| 1 | 9.6 | 2.5 | 7.2 | 38 | 19 | 5/32 |
| 2 | 9.6 | 2.5 | 7.2 | 42 | 9½ | 1/32 |

While the powdered gum dextran composition herein set forth desirably has a fermentation suppression agent in admixture therewith, it is recognized that the fermentation suppression agent be omitted from the powdered composition.

While the gum dextran composition which is incorporated in the mud-laden drilling fluid is preferably produced by using species Leucohostoc Mesenteroides (Cienkowski Van Tieghem), the gum dextran may be produced by other methods and incorporated in the drilling fluid.

While preferably the polysaccharide which is used as a parent material for the gum dextran is cane sugar, beet sugar or maple sugar, it is recognized that other polysaccharide parent materials may be used.

In general, from 1 to 3% by weight of the fermented gum dextran composition is incorporated in the mud-laden drilling fluid. The preferred percentage is about 2%. These percentages may be materially departed from and still come within the spirit of the present invention.

The method of producing gum dextran herein set forth is claimed in copending application, Serial No. 427,839, filed of even date herewith.

We claim:

1. A mud-laden drilling fluid for oil and gas wells, said fluid exhibiting small water loss during use and being adapted to form on the well walls a relatively thin tough substantially impervious coating comprising the product formed from a mixture of a mud base, an aqueous fluid component and a stable wall building gum dextran mud-suspending agent therefor.

2. A mud-laden drilling fluid for oil and gas wells exhibiting small water loss during use and adapted to form on the well walls a relatively thin tough substantially impervious coating, comprising the product formed from a mixture of a mud base, an aqueous fluid component, and from 1 to 3% of a stable wall-building gum dextran mud-suspending agent, said percentage being taken by volume on the drilling fluid.

3. A mud-laden drilling fluid for oil and gas wells exhibiting small water loss during use and adapted to form on the well walls a relatively thin tough substantially impervious coating, comprising the product formed from a mixture of a mud base, an aqueous fluid component, and about 2% of a stable wall-building gum dextran mud-suspending agent, said percentage being taken by volume on the drilling fluid.

4. A mud-laden drilling fluid for oil and gas wells exhibiting small water loss during use and adapted to form on the well walls a relatively thin tough substantially impervious coating, comprising the product formed from a mixture of a mud base, an aqueous fluid component and a polysaccharide fermented substrate containing as its essential mud-suspending agent gum dextran characterized by excellent wall-building properties.

5. A mud-laden drilling fluid for oil and gas wells exhibiting small water loss during use, and adapted to form on the well walls a relatively thin tough substantially impervious coating, comprising the product formed from a mixture of a mud base, an aqueous fluid component and a sucrose fermented substrate containing as its essential mud-suspending agent gum dextran characterized by excellent wall-building properties.

6. A mud-laden drilling fluid for oil and gas wells exhibiting small water loss during use and adapted to form on the well walls a relatively thin tough substantially impervious coating, comprising the product formed from a mixture of a mud base, an aqueous fluid component and a stable powdered mud suspending medium containing gum dextran as its essential mud-suspending agent.

7. A mud-laden drilling fluid for oil or gas wells, said fluid exhibiting small water losses during use and being adapted to form on the well walls a relatively thin tough substantially impervious coating comprising the product formed from a mixture of a mud base, an aqueous fluid component containing a small amount of a saline constituent usually encountered during the drilling of the well and normally increasing the water loss of the drilling fluid, and a stable wall-building gum dextran mud-suspending agent functioning to greatly inhibit said normal water loss.

8. A mud-laden drilling fluid for oil or gas wells, said fluid exhibiting small water losses during use and being adapted to form on the well walls a relatively thin tough substantially impervious coating comprising the product formed from a mixture of a mud base, an aqueous fluid component containing a small amount of sodium chloride normally increasing the water loss of the drilling fluid, and a stable wall-building gum dextran mud-suspending agent functioning to greatly inhibit said normal water loss.

9. A mud-laden drilling fluid for oil or gas wells, said fluid exhibiting small water losses during use and being adapted to form on the well walls a relatively thin tough substantially impervious coating, comprising the product formed from a mixture of a mud base, an aqueous fluid component containing a small amount of a saline constituent usually encountered during the drilling of the well and normally increasing the water loss of the drilling fluid, and a stable powdered wall-building mud-suspending agent containing gum dextran as its essential suspending agent functioning to greatly inhibit said normal water loss.

10. A mud-laden drilling fluid for oil or gas wells, said fluid exhibiting small water losses during use and being adapted to form on the well walls a relatively thin tough substantially impervious coating, comprising the product formed from a mixture of a mud base, an aqueous fluid component containing a small amount of a saline constituent usually encountered during the drilling of the well and normally increasing the water loss of the drilling fluid, and a polysaccharide fermented substrate containing gum dextran as its essential wall-building mud-suspending agent, said gum dextran functioning to greatly inhibit said normal water loss.

11. A mud-laden drilling fluid for oil or gas wells, said fluid exhibiting small water losses during use and being adapted to form on the well walls a relatively thin tough substantially impervious coating, comprising the product formed from a mixture of a mud base, an aqueous fluid component containing a small amount of a saline constituent usually encountered during the drilling of the well and normally increasing the water loss of the drilling fluid, and a sucrose fermented substrate containing as its essential mud-suspending agent gum dextran together with a small proportion of a sugar reaction product incapable of generating fermentation products during use of the drilling fluid, said composition substrate suspending medium functioning to greatly inhibit said normal water loss.

12. A mud laden drilling fluid for oil and gas wells, said drilling fluid exhibiting small water losses during use and being adapted to form on the well walls a relatively thin tough substantially impervious coating comprising the product formed from a mixture of a mud base, a polysaccharide fermented substrate acting as a wall-building mud-suspending medium for the mud base, said fermented substrate containing as its essential suspending agent gum dextran together with a small proportion of the product formed from a mixture of a sugar tending to produce fermentation and a fermentation suppression agent.

13. A mud-laden drilling fluid for oil and gas wells, said drilling fluid exhibiting small water losses during use and being adapted to form on the well walls a relative thin tough substantially imprevious coating comprising the product formed from a mixture of a mud base, a polysaccharide fermented substrate acting as a wall-building mud-suspending medium for the mud base, said fermented substrate containing as its essential suspending agent gum dextran together with a small proportion of the product formed from a mixture of a sugar tending to produce fermentation and a phenol fermentation suppression agent.

14. The method of treating a mud-laden aqueous drilling fluid containing a mud base and an aqueous fluid component, comprising reducing the water loss of said drilling fluid and imparting thereto optimum wall-building characteristics by incorporating in said drilling fluid a stable gum dextran wall building mud-suspending agent.

15. The method of treating a mud-laden aqueous drilling fluid containing a mud base and an aqueous fluid component, comprising reducing the water loss of said drilling fluid and imparting thereto optimum wall building characteristics by incorporating in said drilling fluid a polysaccharide fermented substrate inhibited against fermentation during use of the driling fluid, said substrate containing gum dextran as its essential wall-building mud-suspending agent.

16. The method of treating a mud-laden aqueous drilling fluid containing a mud base and an aqueous fluid component comprising reducing the water loss of said drilling fluid and imparting thereto optimum wall building characteristics by incorporating in said drilling fluid a powdered stable gum dextran-containing medium functioning as a mud-suspending agent having excellent wall-building characteristics.

17. The method comprising treating mud-laden drilling fluid adapted for use in oil and gas wells, having present an aqueous component containing a small amount of a saline constituent normally increasing the water loss of the drilling fluid, by incorporating in said drilling fluid a small amount of gum dextran characterized by the property of substantially inhibiting said water loss and forming on the well walls in conjunction with the mud base, a relatively thin tough substantially impervious coating.

18. The method of treating a mud-laden aqueous drilling fluid containing a mud base and an aqueous fluid component comprising incorporating in said drilling fluid a gum dextran wall-building mud-suspending agent having a pH maintained at and adjacent six.

19. The method of treating a mud-laden aqueous drilling fluid containing a mud base and an aqueous fluid component comprising incorporating in said drilling fluid 1% to 3% of a gum dextran wall-building mud-suspending agent.

20. The method of treating a mud-laden aqueous drilling fluid containing a mud base and an aqueous fluid component comprising incorporating in said drilling fluid 1% to 3% of a gum dextran wall-building mud-suspending agent having a pH maintained at and adjacent six.

21. The method of treating a mud-laden aqueous drilling fluid containing a mud base and an aqueous fluid component comprising incorporating in said drilling fluid a viscous bacteriologically produced gum dextran from which by-products susceptible to fermentation have been removed.

22. The method of treating a mud-laden aqueous drilling fluid containing a mud base and an aqueous fluid component comprising incorporating in said drilling fluid a viscous bacteriologically produced gum dextran powder from which by-products susceptible to fermentation have been removed.

23. The method of treating a mud-laden aqueous drilling fluid containing a mud base and an aqueous fluid component comprising incorporating in said drilling fluid the polysaccharide fermented reaction product containing as its essential mud-suspending agent gum dextran characterized by excellent wall-building properties.

24. The method of treating a mud-laden aqueous drilling fluid containing a mud-base and an aqueous fluid component comprising incorporating in said drilling fluid 1% to 3% of the polysaccharide fermented reaction product containing as its essential mud-suspending agent gum dextran characterized by excellent wall-building properties.

WILLIAM LUDWELL OWEN, JR.
WILLIAM L. OWEN.
L. HORACE BAILEY.